(12) United States Patent
Li et al.

(10) Patent No.: US 9,927,908 B2
(45) Date of Patent: Mar. 27, 2018

(54) IN-CELL TOUCH PANEL AND DISPLAY DEVICE

(71) Applicants: BOE Technology Group Co., Ltd., Beijing (CN); Beijing BOE Optoelectronics Technology Co., Ltd., Beijing (CN)

(72) Inventors: Yanchen Li, Beijing (CN); Dong Yang, Beijing (CN); Rui Xu, Beijing (CN); Shuai Han, Beijing (CN); Zhiying Bao, Beijing (CN); Zhenhua Lv, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 14/892,254

(22) PCT Filed: Jun. 3, 2015

(86) PCT No.: PCT/CN2015/080686
§ 371 (c)(1),
(2) Date: Nov. 19, 2015

(87) PCT Pub. No.: WO2016/110045
PCT Pub. Date: Jul. 14, 2016

(65) Prior Publication Data
US 2016/0357308 A1    Dec. 8, 2016

(30) Foreign Application Priority Data
Jan. 9, 2015 (CN) .......................... 2015 1 0011922

(51) Int. Cl.
*G06F 3/041* (2006.01)
*G06F 3/044* (2006.01)
(Continued)

(52) U.S. Cl.
CPC ........ *G06F 3/0416* (2013.01); *G02F 1/13338* (2013.01); *G02F 1/13439* (2013.01);
(Continued)

(58) Field of Classification Search
CPC .. G09G 3/36; G09G 5/00; G06F 3/041; G06F 3/045; G01R 27/26; G06K 11/06; G08C 21/00
See application file for complete search history.

(56) References Cited

U.S. PATENT DOCUMENTS 9,519,374 B2      12/2016   Liu et al.
2012/0169576 A1 *  7/2012   Wang ................. G02F 1/13394
                                                    345/88
(Continued)

FOREIGN PATENT DOCUMENTS

CN        101515095 A     8/2009
CN        102855038 A     1/2013
(Continued)

OTHER PUBLICATIONS

International Search Report and Written Opinion for International Application No. PCT/CN2015/080686, dated Aug. 26, 2015, 10 pages.
(Continued)

*Primary Examiner* — Pegeman Karimi
(74) *Attorney, Agent, or Firm* — Westman, Champlin & Koehler, P.A.

(57) ABSTRACT

The present disclosure provides an in-cell touch panel and a display device, wherein each self-capacitance electrode is provided with a transversal slit within a region of the self-capacitance electrode corresponding to a gap between two adjacent pixel units in a column direction, and/or each self-capacitance electrode is provided with a longitudinal slit within a region of the self-capacitance electrode corresponding to a gap between two adjacent pixel units in a row direction, so that it can ensure that the slits in the self-capacitance electrodes and the gaps between the self-capacitance electrodes are uniformly arranged in the whole in-cell
(Continued)

touch panel, thereby overcoming the defects such as bright lines, dark lines or the like in the in-cell touch panel.

20 Claims, 14 Drawing Sheets

(51) Int. Cl.
*G02F 1/1333* (2006.01)
*G02F 1/1335* (2006.01)
*G02F 1/1343* (2006.01)
*G02F 1/1362* (2006.01)

(52) U.S. Cl.
CPC .. *G02F 1/133512* (2013.01); *G02F 1/134336* (2013.01); *G02F 1/136286* (2013.01); *G06F 3/044* (2013.01); *G06F 3/0412* (2013.01); *G02F 1/134309* (2013.01); *G02F 2201/121* (2013.01); *G06F 2203/04103* (2013.01)

(56) References Cited

U.S. PATENT DOCUMENTS

| | | | |
|---|---|---|---|
| 2012/0268418 A1 | 10/2012 | Ishizaki et al. | |
| 2013/0335365 A1* | 12/2013 | Kim | G06F 3/044 345/174 |
| 2014/0160376 A1* | 6/2014 | Wang | G06F 3/044 349/12 |
| 2015/0177880 A1* | 6/2015 | Shin | G06F 3/0412 345/174 |
| 2015/0241908 A1 | 8/2015 | Ozyilmaz et al. | |
| 2016/0011702 A1* | 1/2016 | Shih | G06F 3/0416 345/174 |
| 2016/0048241 A1 | 2/2016 | Zhao et al. | |

FOREIGN PATENT DOCUMENTS

| | | |
|---|---|---|
| CN | 104020892 A | 9/2014 |
| CN | 104020893 A | 9/2014 |
| CN | 104020909 A | 9/2014 |
| CN | 104035640 A | 9/2014 |
| CN | 104461209 A | 3/2015 |
| WO | 2014/055040 A1 | 4/2014 |

OTHER PUBLICATIONS

English translation of Box No. V of the Written Opinion of the International Searching Authority for International Application No. PCT/CN2015/080686, 2 pages.

First Office Action, including Search Report, for Chinese Patent Application No. 201510011922.7, dated Jan. 19, 2017, 10 pages.

Second Office Action from Chinese Patent Application No. 201510011922.7, dated Jul. 11, 2017, 10 pages.

* cited by examiner

IN-CELL TOUCH PANEL AND DISPLAY DEVICE

CROSS-REFERENCE TO RELATED APPLICATION

This application is a Section 371 National Stage Application of International Application No. PCT/CN2015/080686, filed 3 Jun. 2015, entitled "IN-CELL TOUCH PANEL AND DISPLAY DEVICE", which has not yet published, and which claims priority to Chinese Application No. 201510011922.7, filed on 7 Jan. 2015, incorporated herein by reference in their entirety.

BACKGROUND OF THE INVENTION

Field of the Invention

Embodiments of the present invention generally relate to the field of touch technologies, and particularly, to an in-cell touch panel and a display device.

Description of the Related Art

With quick development of display technologies, touch panels (TP) are increasingly extending all over the people's lives. Currently, the touch panels may be classified, according to configurations thereof, as: an add-on touch panel, an on-cell touch panel and an in-cell touch panel. Among others, the add-on touch panel is a liquid display panel with a touch function formed by separately manufacturing a touch panel and a liquid display panel (LCD) and then bonding them together; the add-on touch panel has disadvantages such as higher production cost, lower light transmittance, thicker module and the like. In contrast, in the in-cell touch panel, touch electrodes of the touch panel are embedded inside of the liquid display panel, so that the thickness of the whole module can be reduced, and the production cost of the touch panel can be also decreased greatly, thus the in-cell touch panel is highly appreciated by panel manufacturers.

At present, existing in-cell touch panels are configured to detect a touch position of a finger based on a mutual capacitance or self-capacitance principle. With the self-capacitance principle, a plurality of self-capacitance electrode may be arranged in the same layer in the touch panel and be insulated from one another; when the panel is not touched by a human body, the capacitance carried by each self-capacitance electrode is a fixed value; when the panel is touched by a human body, the capacitance carried by the corresponding self-capacitance electrode is the fixed value plus a body capacitance, and a touch detection chip detects changes in capacitance values of respective capacitance electrodes during a touch time period so as to determine the touch position. The body capacitance may contribute to all self-capacitances, while the body capacitance can only contribute to a projection capacitance in the mutual capacitance, thus an amount of change in touch capacitance in a self-capacitances-based touch panel, which is caused due to the panel being touched by a human body, will be larger than that in a touch panel manufactured according to the mutual capacitance principle. Thus, compared to the mutual capacitance based touch panel, the self-capacitances-based touch panel can effectively increase touch signal-to-noise ratio, thereby improving accuracy for touch sensing.

A specific configuration of the existing in-cell touch panel is shown in FIG. 1, where one self-capacitance electrode 1 corresponds to a plurality of pixel units 2 of the liquid display panel, and adjacent self-capacitance electrodes 1 are insulated from each other via a gap S. In this in-cell touch panel, however, the gap S is located between adjacent self-capacitance electrodes 1, thus when displaying, there will be a difference in brightness between the gap ("A" region shown in FIG. 1) between adjacent self-capacitance electrodes 1 and an interior portion ("B" region shown in FIG. 1) of the self-capacitance electrode 1 in the display panel, thereby resulting in undesirable defects such as bright lines, dark lines or the like in the display panel.

SUMMARY

In view of the above, embodiments of the present disclosure provide an in-cell touch panel, for overcoming defects such as bright lines, dark lines or the like in a displayed image in prior arts.

In one aspect, embodiments of the present disclosure provide an in-cell touch panel, the in-cell touch panel comprises:

an upper substrate and a lower substrate oppositely arranged, a number of pixel units arranged in a matrix on the lower substrate, a number of independent self-capacitance electrodes located on a side of the upper substrate facing toward the lower substrate or a side of the lower substrate facing toward the upper substrate, being independent of each other and each corresponding to one or more of the pixel units; and conductive wires each electrically connected with a corresponding one of the respective self-capacitance electrodes, wherein each self-capacitance electrode is provided with a longitudinal slit within a region of the self-capacitance electrode corresponding to a gap between two adjacent pixel units in a row direction of the matrix; and/or each self-capacitance electrode is provided with a transversal slit within a region of the self-capacitance electrode corresponding to a gap between two adjacent pixel units in a column direction of the matrix.

Optionally, in the above in-cell touch panel according to embodiments of the present disclosure, each self-capacitance electrode is further provided with one or more longitudinal slits and/or one or more transversal slits within a region of the self-capacitance electrode corresponding to each pixel unit.

Optionally, in the above in-cell touch panel according to embodiments of the present disclosure, a width of the longitudinal slit is equal to a width of a gap between two adjacent columns of self-capacitance electrodes.

Optionally, in the above in-cell touch panel according to embodiments of the present disclosure, a width of the transversal slit is equal to a width of a gap between two adjacent rows of self-capacitance electrodes.

Optionally, in the above in-cell touch panel according to embodiments of the present disclosure, in each self-capacitance electrode, lengths of respective longitudinal slits are equal, and/or lengths of respective transversal slits are equal.

Optionally, in the above in-cell touch panel according to embodiments of the present disclosure, the transversal slits and the longitudinal slits in all self-capacitance electrodes are arranged in the same regular pattern.

Optionally, in the above in-cell touch panel according to embodiments of the present disclosure, the self-capacitance electrodes being independent of each other are arranged in the same layer, in order to simplify manufacturing process.

Optionally, in order to simplify manufacturing process and reduce production cost, in the above in-cell touch panel according to embodiments of the present disclosure, the respective self-capacitance electrodes form a common electrode layer located on the side of the lower substrate facing toward the upper substrate, and the in-cell touch panel further comprises a touch detection chip, configured to apply a common electrode signal to the respective self-capacitance electrodes during a display time period of the in-cell touch panel, and to detect changes in capacitance values of the respective self-capacitance electrodes to determine a touch position during a touch time period of the in-cell touch panel.

Optionally, in order to simplify manufacturing process and reduce production cost, the above in-cell touch panel according to embodiments of the present disclosure may further comprise data lines below the self-capacitance electrodes, and the respective conductive wires and the data lines are arranged in the same layer and made of the sam Optionally, the above in-cell touch panel according to embodiments of the present disclosure may further comprise a black matrix layer located on a side of the lower substrate facing toward the upper substrate or on a side of the upper substrate facing toward the lower substrate, and a direct projection of a separation gap between every two adjacent self-capacitance electrodes on the lower substrate is located within a region where a pattern of the black matrix layer is located.

Correspondingly, embodiments of the present disclosure further provide a display device, comprising the above in-cell touch panel according to any one of the above embodiments of the present disclosure.

With the in-cell touch panel and display device according to embodiments of the present disclosure, each self-capacitance electrode is provided with a longitudinal slit within a region of the self-capacitance electrode corresponding to a gap between two adjacent pixel units in a row direction, and/or each self-capacitance electrode is provided with a transversal slit within a region of the self-capacitance electrode corresponding to a gap between two adjacent pixel units in a column direction, thus it can ensure that the slits in the self-capacitance electrodes and the gaps between the self-capacitance electrodes are uniformly arranged in the whole in-cell touch panel, thereby overcoming the defects such as bright lines, dark lines or the like in the in-cell touch panel.

BRIEF DESCRIPTION OF THE DRAWINGS

FIG. 3b is a structural schematic diagram of a self-capacitance electrode of the in-cell touch panel shown in FIG. 3a;

FIG. 4b is a structural schematic diagram of a self-capacitance electrode of the in-cell touch panel shown in FIG. 4a;

FIG. 5b is a structural schematic diagram of a self-capacitance electrode of the in-cell touch panel shown in FIG. 5a;

FIG. 6b is a structural schematic diagram of a self-capacitance electrode of the in-cell touch panel shown in FIG. 6a;

DETAILED DESCRIPTION OF PREFERRED EMBODIMENTS OF THE INVENTION

Figure 1:
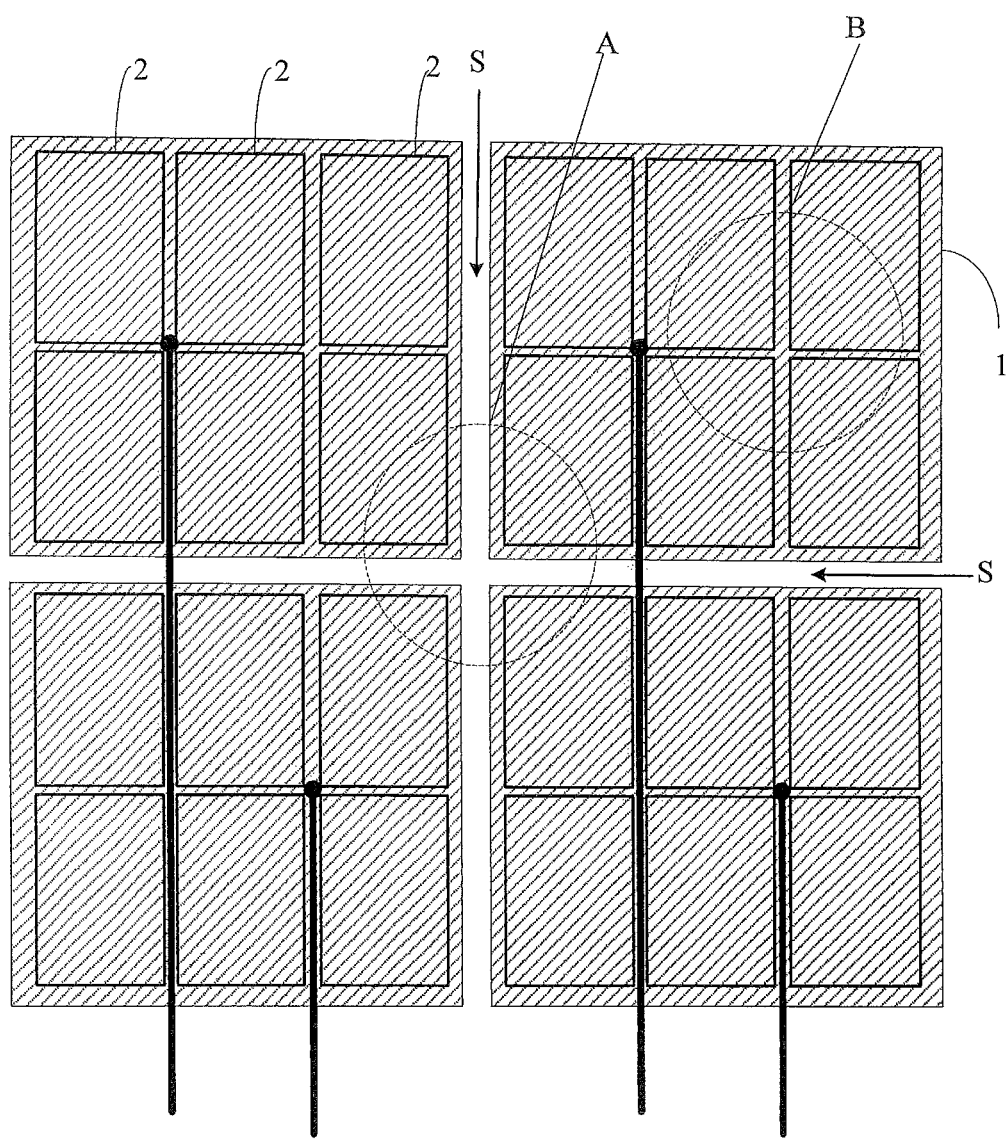
FIG. 1 is a structural schematic diagram of an existing in-cell touch panel.

Specific implementations of the in-cell touch panel and the display device according to embodiments of the present disclosure will be described hereinafter in detail in conjunction with the attached drawings.

Shapes and thicknesses of respective film layers shown in the drawings are not scaled to the real proportion, and are only intended to illustrate contents of the present disclosure.

Figure 2A:
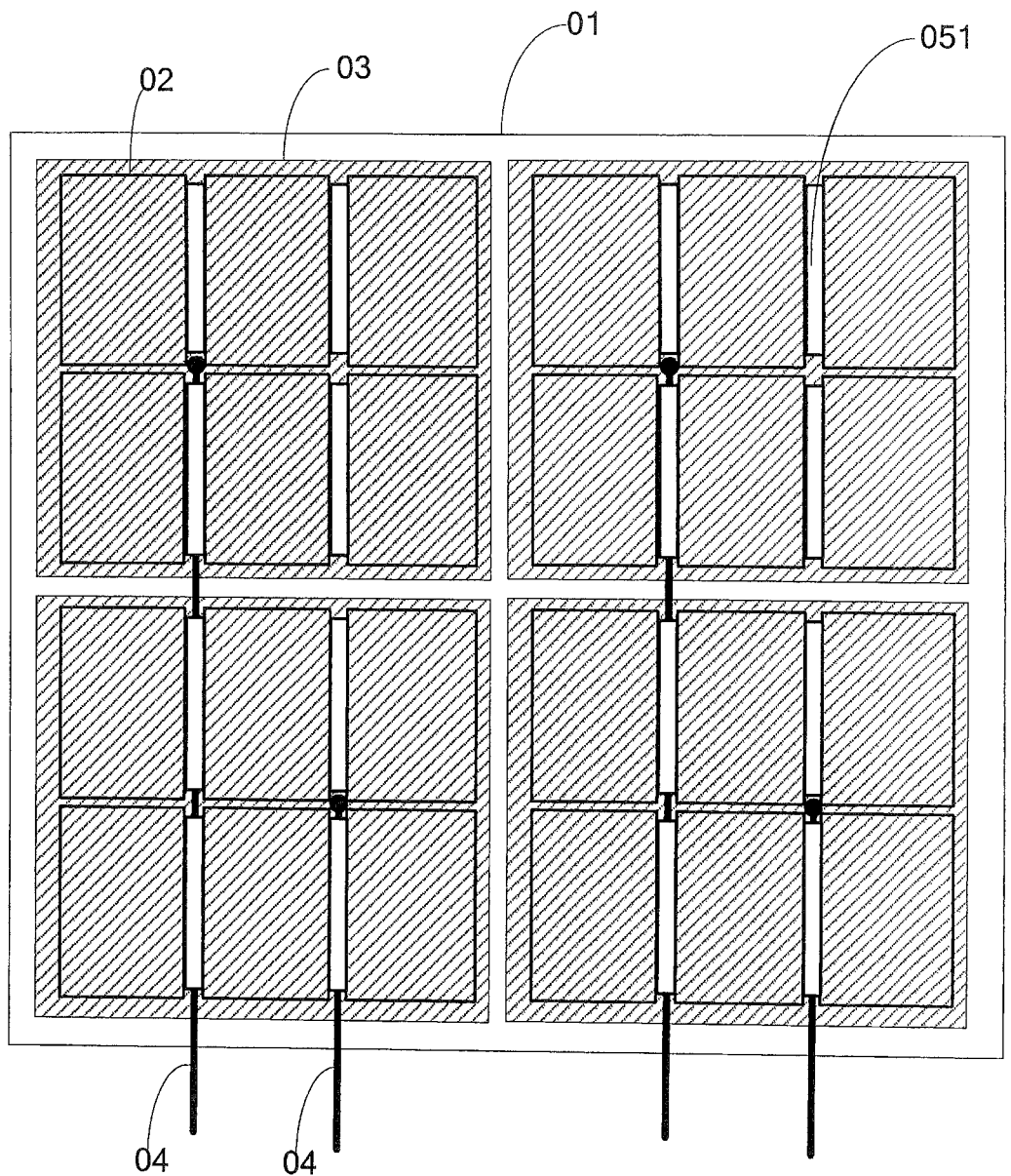
FIG. 2a is a structural schematic diagram of an in-cell touch panel according to a first exemplary embodiment of the present disclosure.
Figure 2B:
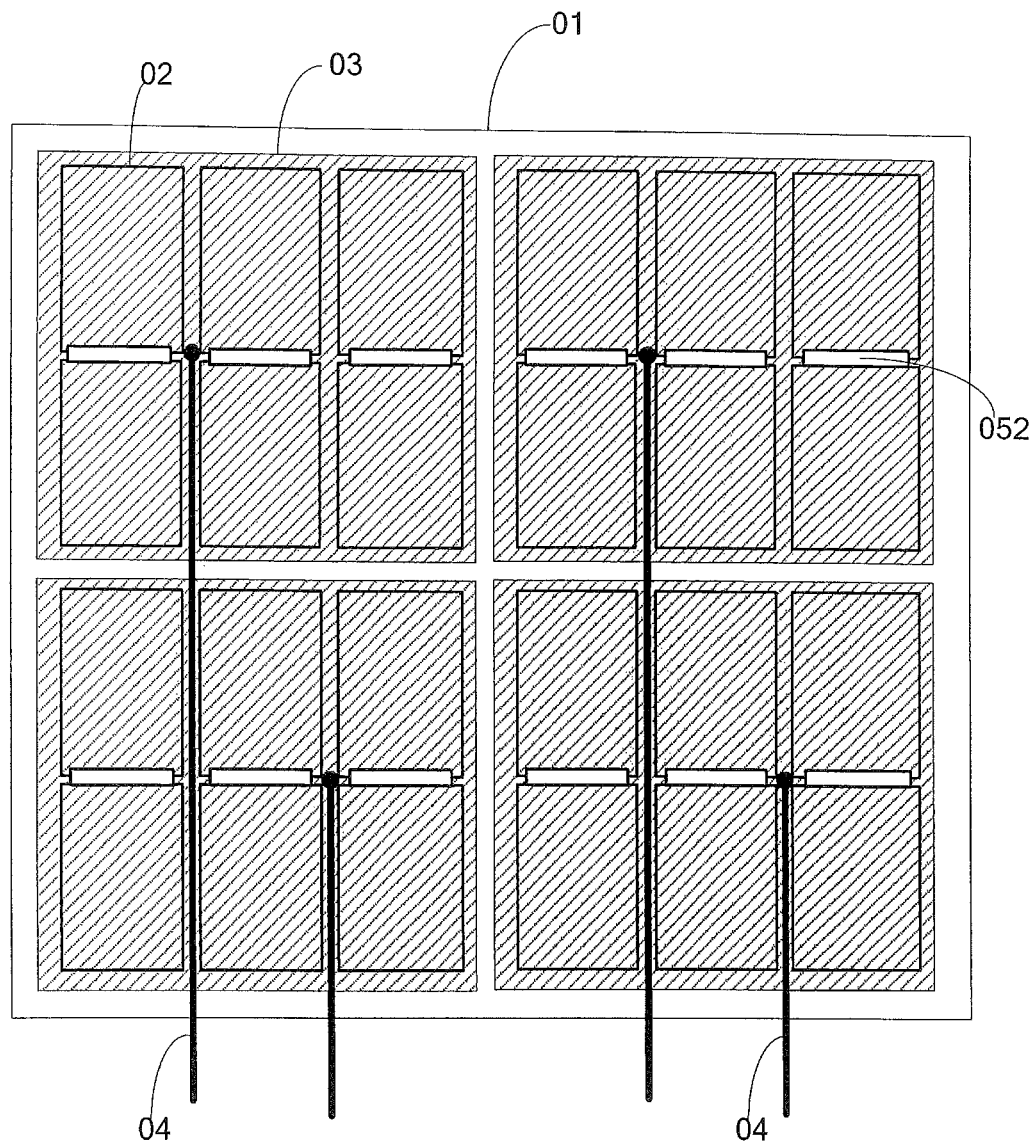
FIG. 2b is a structural schematic diagram of an in-cell touch panel according to a second exemplary embodiment of the present disclosure.
Figure 2C:
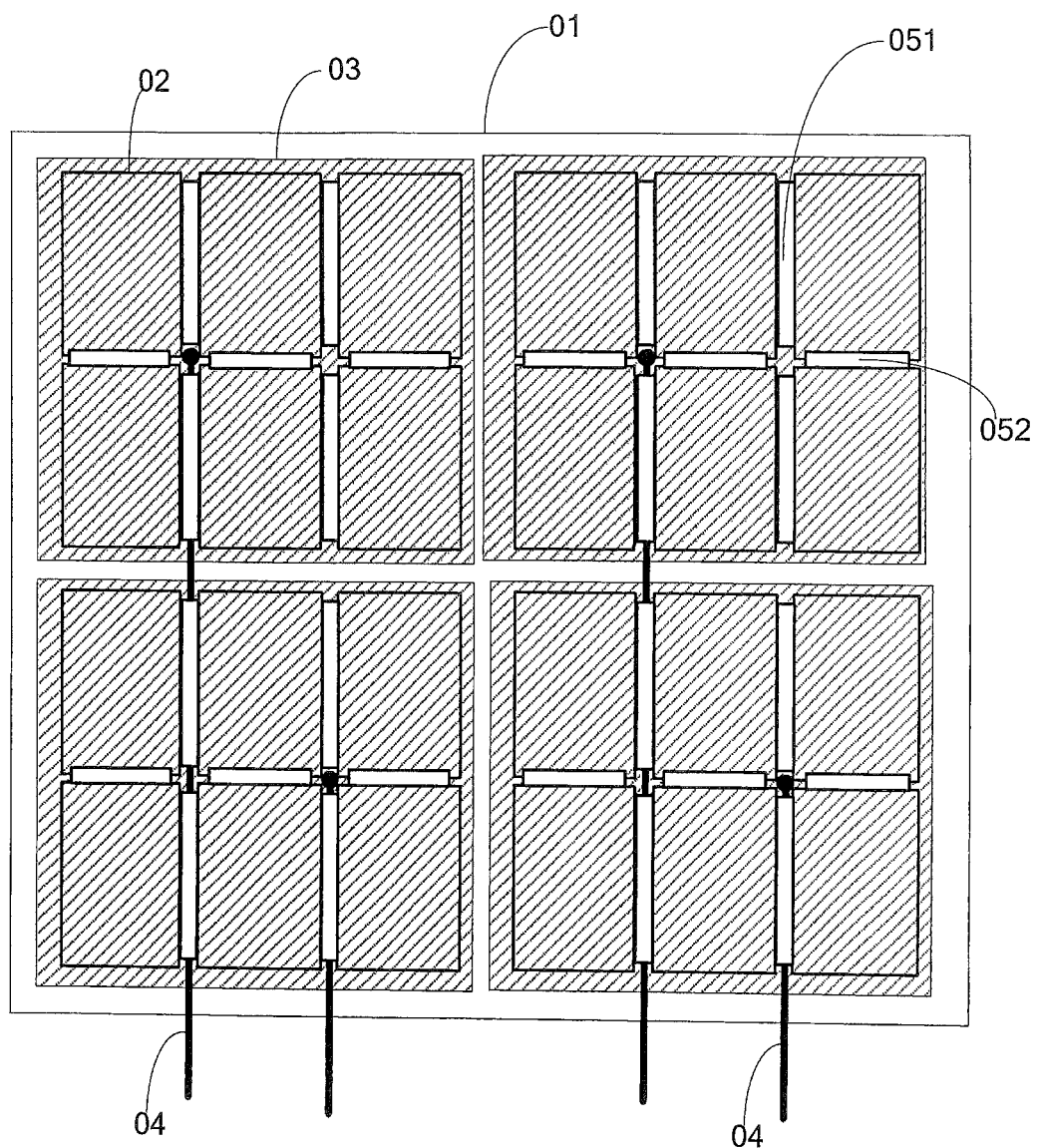
FIG. 2c is a structural schematic diagram of an in-cell touch panel according to a third exemplary embodiment of the present disclosure.
Figure 3A:
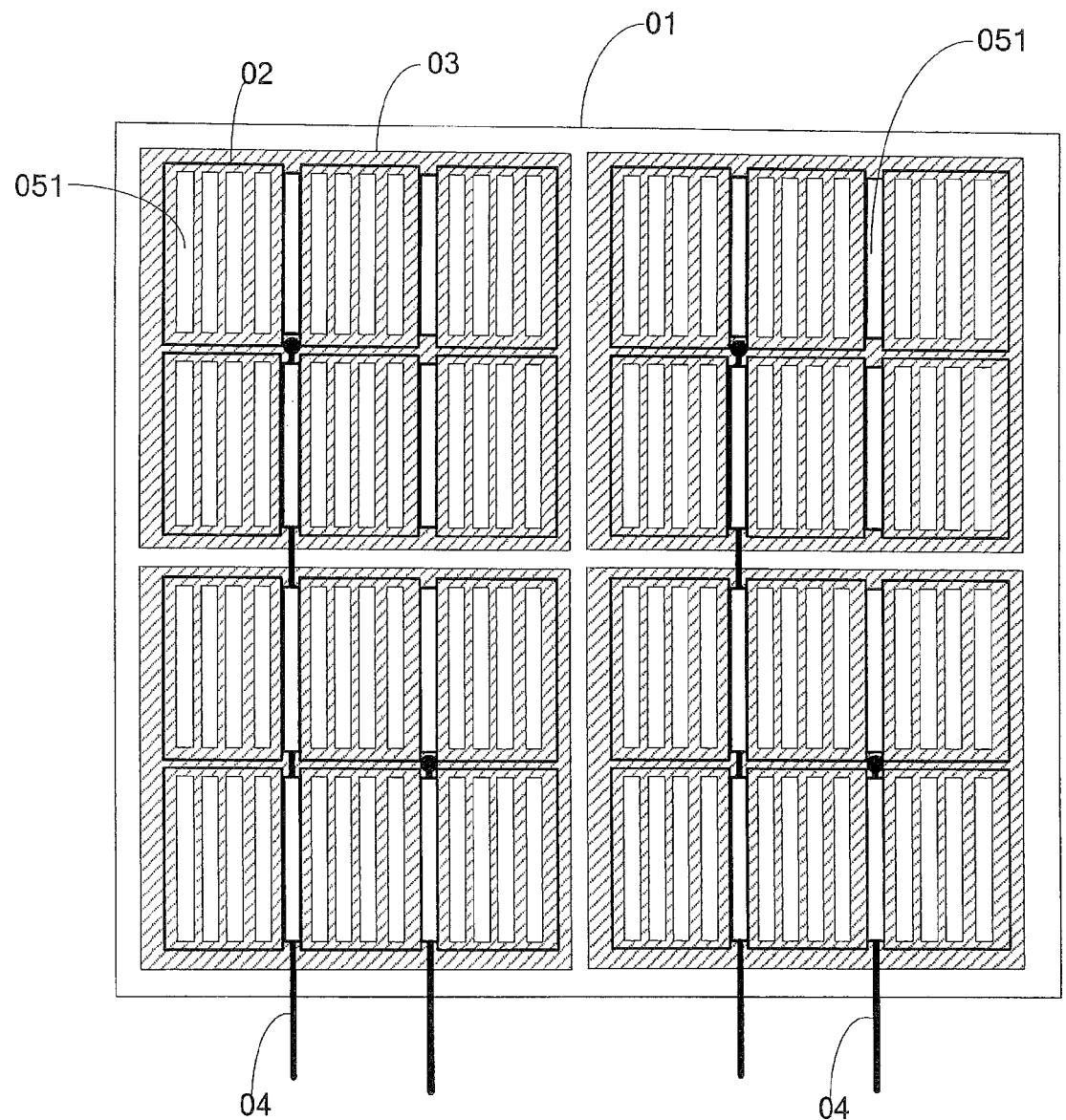
FIG. 3a is a structural schematic diagram of an in-cell touch panel according to a fourth exemplary embodiment of the present disclosure.
Figure 3B:
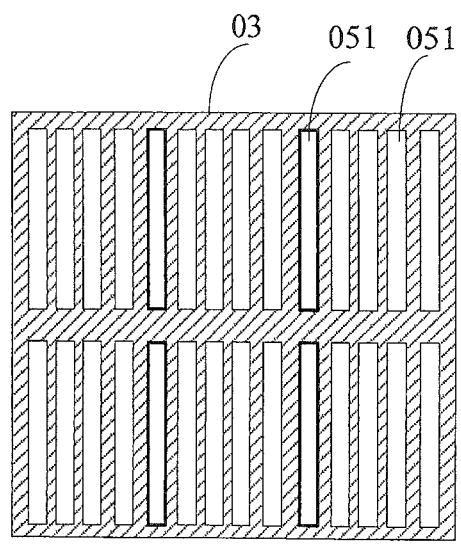
Figure 4A:
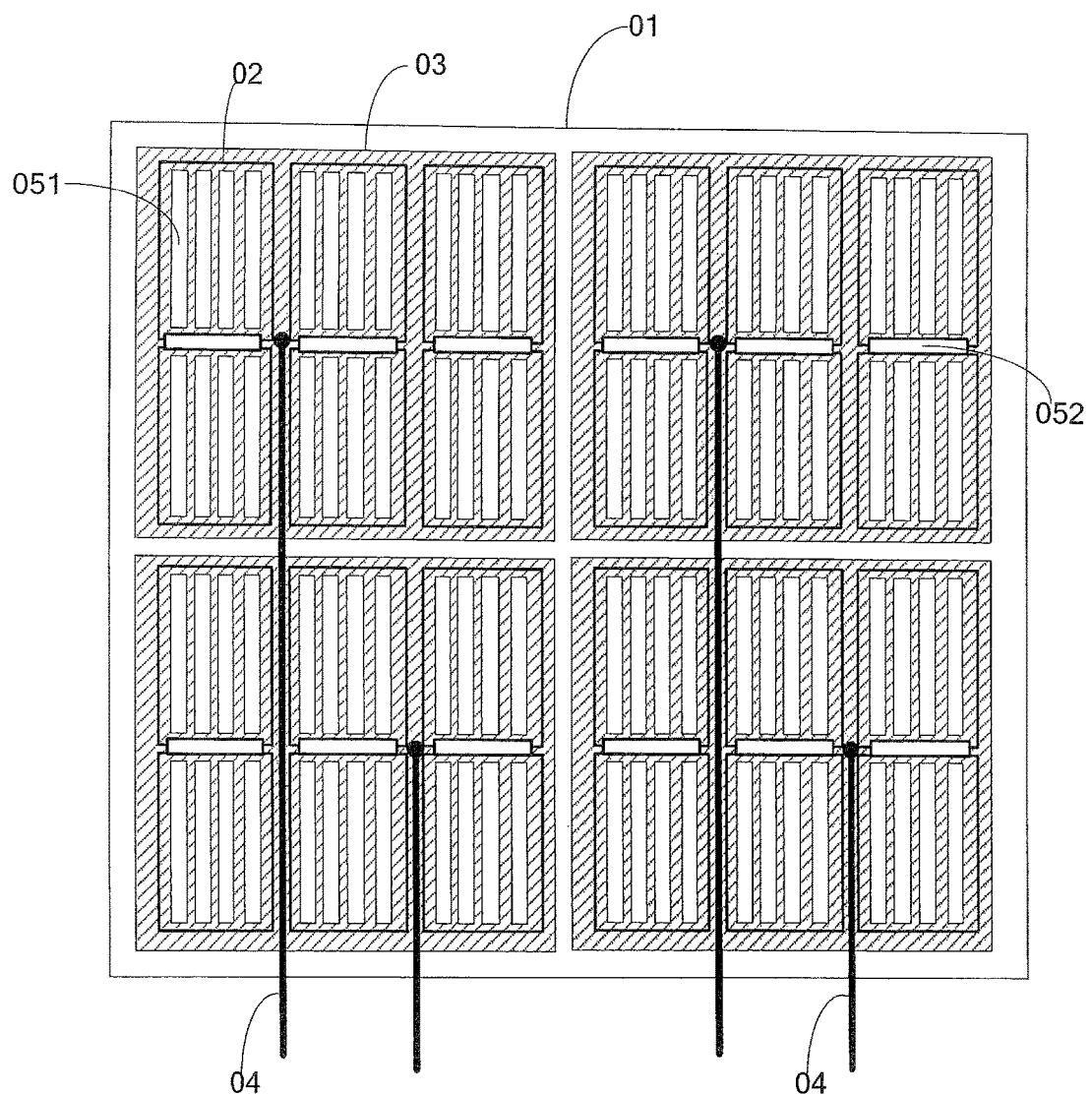
FIG. 4a is a structural schematic diagram of an in-cell touch panel according to a fifth exemplary embodiment of the present disclosure.
Figure 4B:
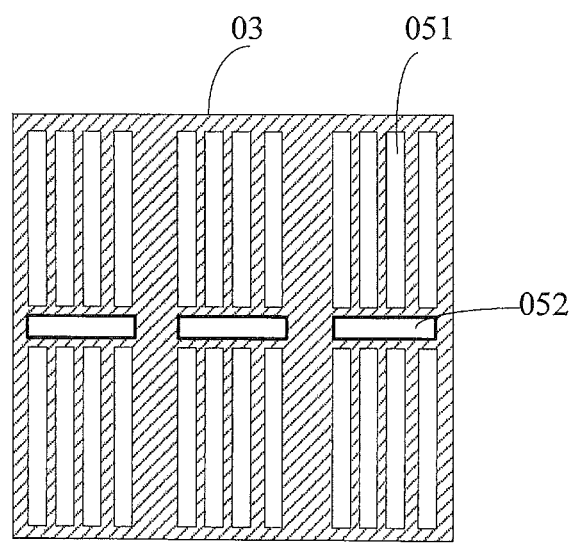
Figure 5A:
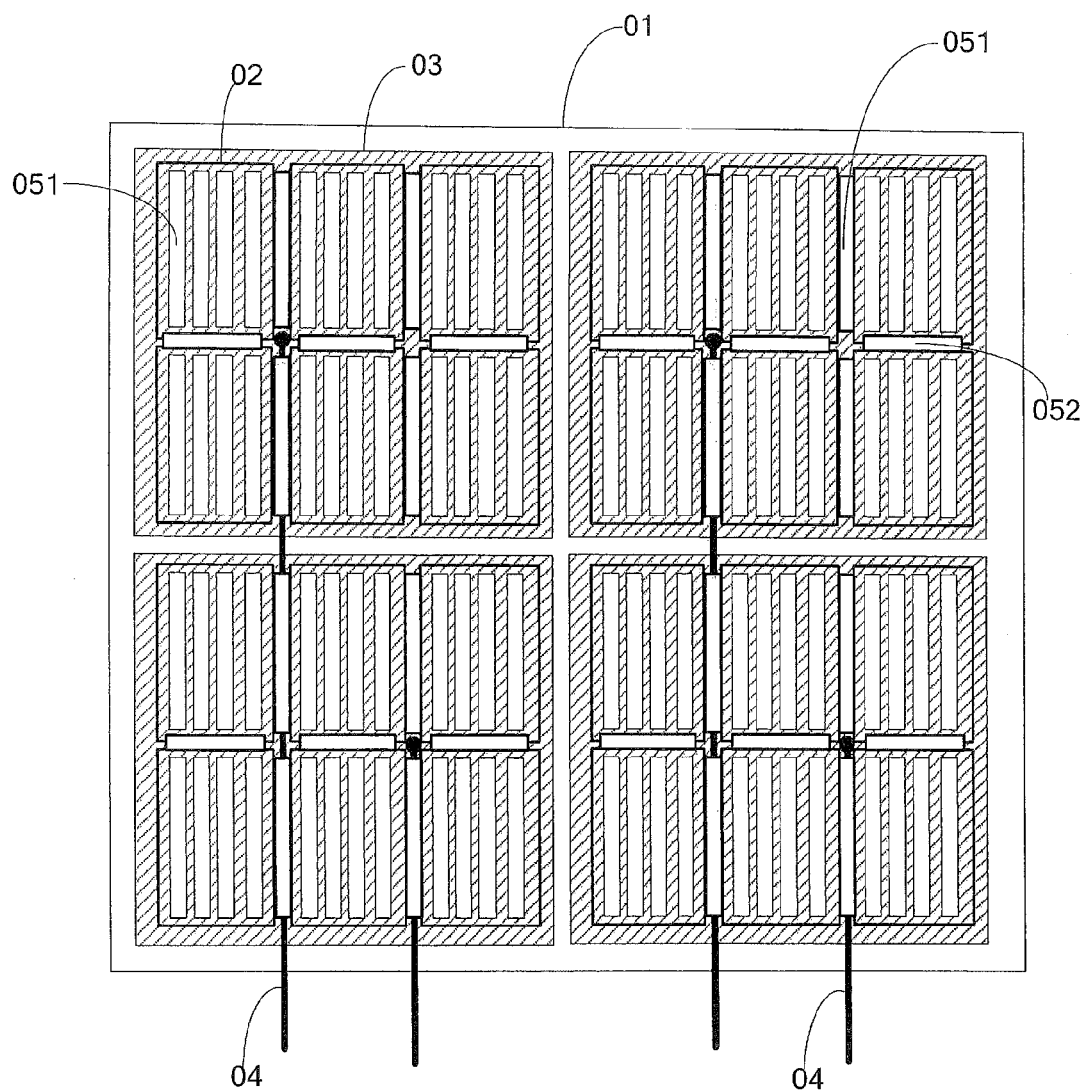
FIG. 5a is a structural schematic diagram of an in-cell touch panel according to a sixth exemplary embodiment of the present disclosure.
Figure 5B:
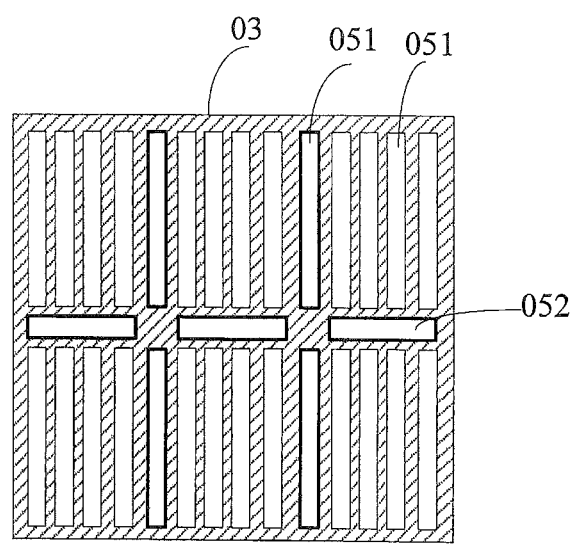
Figure 6A:
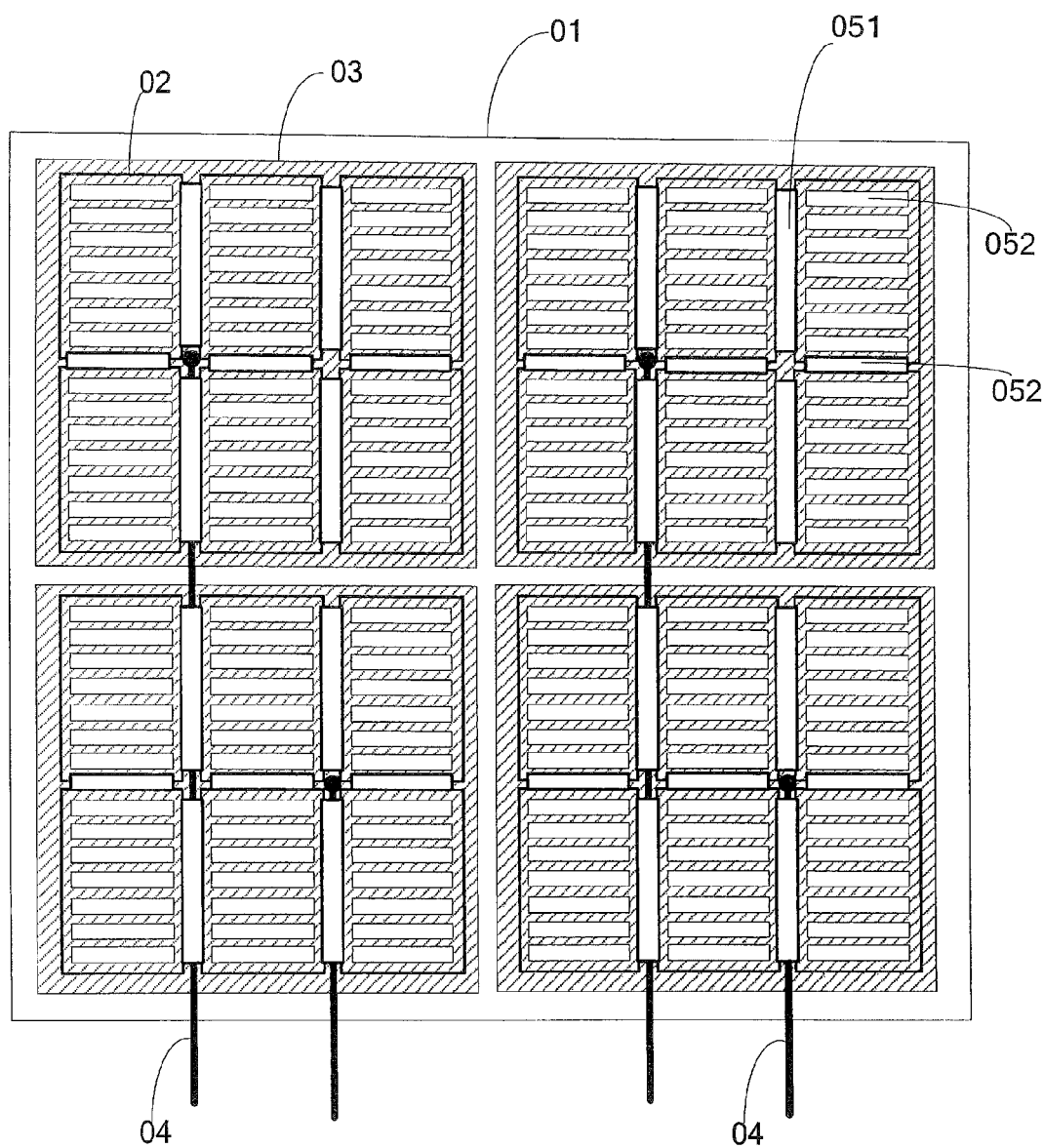
FIG. 6a is a structural schematic diagram of an in-cell touch panel according to a seventh exemplary embodiment of the present disclosure.
Figure 6B:
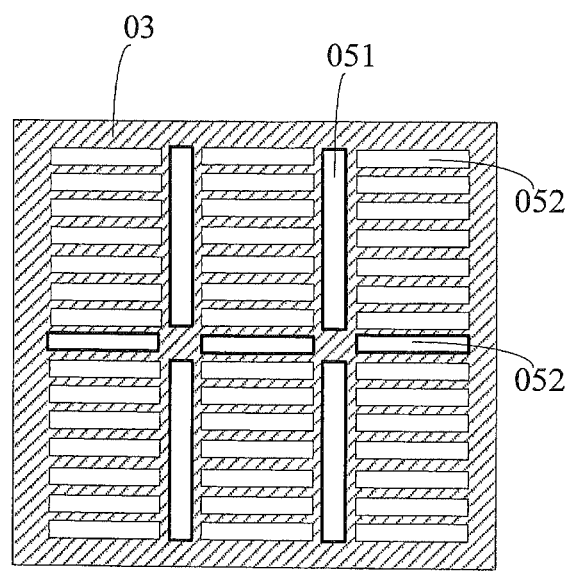

Embodiments of the present disclosure provide an in-cell touch panel, as shown in FIG. 2a to FIG. 2c, comprising: an upper substrate (not shown in the figures) and a lower substrate 01 oppositely arranged, a number of pixel units 02 arranged in a matrix on the lower substrate 01, a number of independent self-capacitance electrodes 03 located on a side of the upper substrate facing toward the lower substrate 01 or a side of the lower substrate 01 facing toward the upper substrate, being independent of each other and each corresponding to a plurality of pixel units 02, and conductive wires 04 each electrically connected with a corresponding one of the respective self-capacitance electrodes 03; FIG. 2a to FIG. 2c show an arrangement where the self-capacitance electrodes 03 and the conductive wires 04 are provided on a side of the lower substrate 01 facing toward the upper substrate;

each self-capacitance electrode 03 is provided with a longitudinal slit 051 within a region of the self-capacitance electrode corresponding to a gap between two adjacent pixel units 02 in a row direction of the matrix, that is, is provided with a longitudinal slit 051 within a region of the self-capacitance electrode corresponding to a gap between two adjacent columns of pixel units 02; for example, as shown, the self-capacitance electrode 03 is provided with a longitudinal slit 051 within a region thereof corresponding to a gap between two adjacent pixel units 02 among two adjacent columns of pixel units; and/or each self-capacitance electrode 03 is provided with a transversal slit 052 within a region of the self-capacitance electrode corresponding to a gap between two adjacent pixel units 02 in a column direction of the matrix, that is, is provided with a transversal slit 052 within a region of the self-capacitance electrode corresponding to a gap between two adjacent rows of pixel units 02; for example, as shown, the self-capacitance electrode 03 is provided with a transversal slit 052 within a region thereof corresponding to a gap between two adjacent pixel units 02 among two adjacent rows of pixel units.

With above the in-cell touch panel according to embodiments of the present disclosure, each self-capacitance electrode is provided with a longitudinal slit within a region of the self-capacitance electrode corresponding to a gap between two adjacent pixel units in a row direction, and/or each self-capacitance electrode is provided with a transversal slit within a region of the self-capacitance electrode corresponding to a gap between two adjacent pixel units in a column direction, thus it can ensure that the slits in the self-capacitance electrodes and the gaps between the self-capacitance electrodes are uniformly arranged in the whole in-cell touch panel, thereby overcoming the defects such as bright lines, dark lines or the like in the in-cell touch panel.

It will be appreciated that the above longitudinal slit and/or transversal slit is not limited to a single-slit form, and each longitudinal slit and/or transversal slit may also includes a plurality of sub-slits or be in a form of grid, which is not particularly limited herein; the shape of each longitudinal slit and/or transversal slit is not limited to the rectangle shape shown in the figures, and Optionally, is provided to match the shape of the gap.

Optionally, in order to further ensure uniformity of the slits on the whole display panel, in the above in-cell touch panel according to embodiments of the present disclosure, as shown in FIG. 3a to FIG. 6b, each self-capacitance electrode 03 may be further provided with one or more longitudinal slits 051 and/or one or more transversal slits 052 within a region of the self-capacitance electrode corresponding to each pixel unit 02.

Optionally, in the above in-cell touch panel according to embodiments of the present disclosure, a width of the longitudinal slit is equal to a width of a gap between two adjacent columns of self-capacitance electrodes. Specifically, when implemented in practice, the width of the gap between two adjacent columns of self-capacitance electrodes is generally about 5 µm the present disclosure is not limited to this.

Optionally, in the above in-cell touch panel according to embodiments of the present disclosure, a width of the transversal slit is equal to a width of a gap between two adjacent rows of self-capacitance electrodes. Specifically, when implemented in practice, the width of the gap between two adjacent rows of self-capacitance electrodes is generally about 5 µm, the present disclosure is not limited to this.

Exemplarily, in order to ensure uniform distribution of the slits in the above in-cell touch panel according to embodiments of the present disclosure, when implemented in practice, in each self-capacitance electrode, lengths of respective longitudinal slits are equal, or lengths of respective transversal slits are equal.

Optionally, in the above in-cell touch panel according to embodiments of the present disclosure, lengths of respective longitudinal slits are equal, and lengths of respective transversal slits are equal, in order to ensure uniform distribution of the slits.

Optionally, in order to ensure uniform distribution of the slits in the above in-cell touch panel according to embodiments of the present disclosure, the transversal slits and the longitudinal slits in all self-capacitance electrodes are arranged in the same regular pattern, in other words, a pattern of an array formed by the longitudinal slits and the transversal slits in each self-capacitance electrode is the same as that of other self-capacitance electrodes. For example, the transversal slits in all self-capacitance electrodes have the same shape (for example, width, length and the like), are located the same relative position with respect to the self-capacitance electrodes or pixel units, are aligned in the column direction, spacings between transversal slits in each self-capacitance electrode are equal, and the like; similarly, the longitudinal slits in all self-capacitance electrodes have the same shape (for example, width, length and the like), are located the same relative position with respect to the self-capacitance electrodes or pixel units, are aligned in the row direction, spacings between longitudinal slits in each self-capacitance electrode are equal, and the like; and/or the transversal slit and the longitudinal slit have the same shape.

Optionally, in the above in-cell touch panel according to embodiments of the present disclosure, the self-capacitance electrodes being independent of each other are arranged in the same layer, in order to simplify manufacturing process. As such, patterns of all self-capacitance electrodes can be formed only by performing one patterning process, thereby enabling reduction in process steps and save in manufacturing cost. Of course, the self-capacitance electrode may be manufactured in a layer by layer way, and the present disclosure is not limited to this.

Further, when implemented in practice, the above in-cell touch panel according to embodiments of the present disclosure is not only applicable to a Twisted Nematic (TN) mode liquid display panel, but also applicable to an Advanced Dimension Switch (ADS) mode liquid display panel, High-aperture-ratio Advanced Dimension Switch (High-Advanced Dimension Switch, HADS) mode liquid display panel and an In-Plane Switch (IPS) mode liquid display panel.

Specifically, when implemented in practice, a common electrode in the HADS mode liquid display panel generally has a slit-electrode configuration, that is, common electrode is provided with a plurality of slit within regions thereof corresponding to respective pixel units. Thus, the above in-cell touch panel according to embodiments of the present disclosure is particularly suitable for the HADS mode liquid display panel.

Further, when the above in-cell touch panel according to embodiments of the present disclosure is applied to the HADS mode liquid display panel, a common electrode layer of the HADS mode liquid display panel having a slit-electrode configuration doubles as the self-capacitance electrodes, that is, the respective self-capacitance electrodes form the common electrode layer on a side of the lower substrate facing toward the upper substrate; in this case, the in-cell touch panel may further comprise a touch detection chip, configured to apply a common electrode signal to the respective self-capacitance electrodes during a display time period of the in-cell touch panel, and to detect changes in capacitance values of the respective self-capacitance electrodes to determine a touch position during a touch time period of the in-cell touch panel. As such, when modifying the configuration of the common electrode layer to form the self-capacitance electrodes so as to achieve a touch function, no additional process is required on basis of the existing processes of manufacturing the lower substrate, so that production cost can be saved, and production efficiency can be improved.

Specifically, the above touch panel according to embodiments of the present disclosure includes a common electrode layer doubling as the self-capacitance electrodes, thus when implemented in practice, a time-sharing driving mode is applied for touch and display stages in order to reduce mutual interference between display signals and touch signals; in one example, when implemented in practice, a display drive chip and a touch detection chip may be integrated into one chip, thereby further reducing production cost.

Figure 7A:
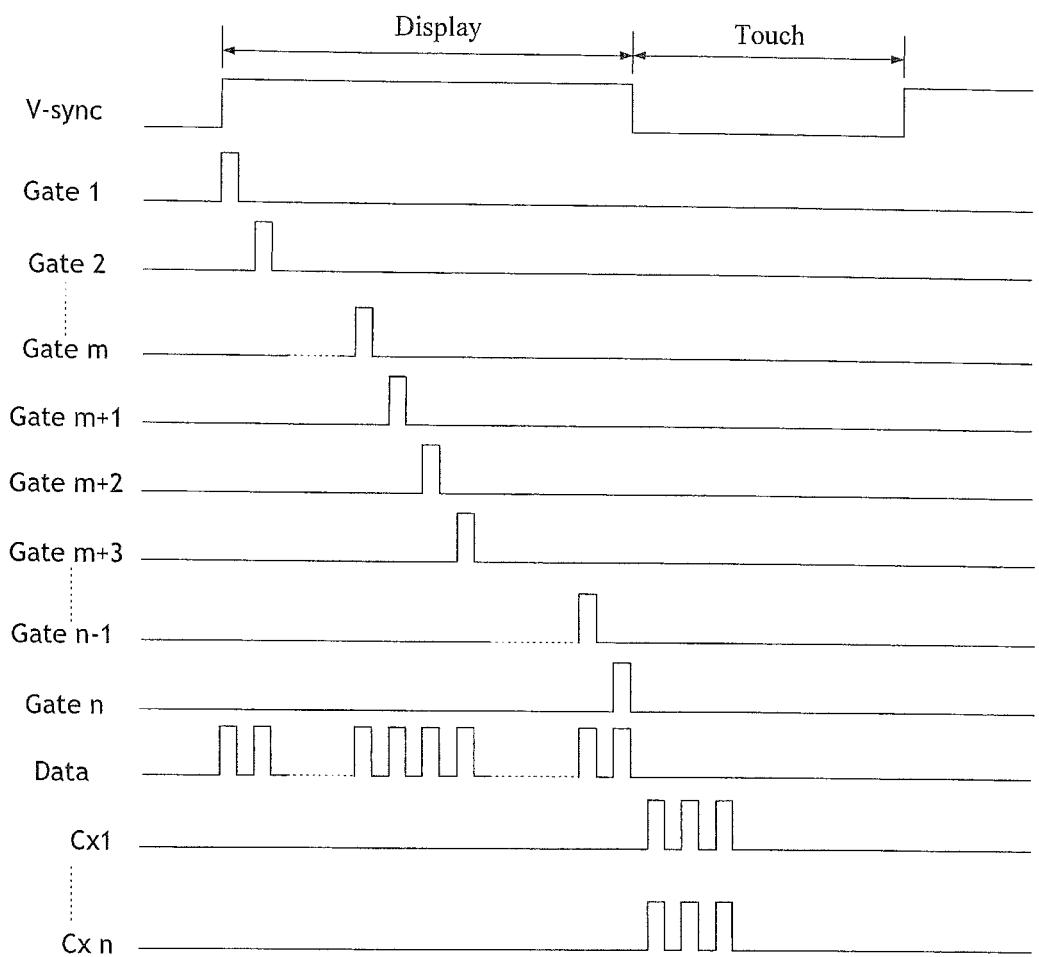
FIG. 7a is a schematic diagram of a driving time sequence for an in-cell touch panel according to an exemplary embodiment of the present disclosure.
Figure 7B:
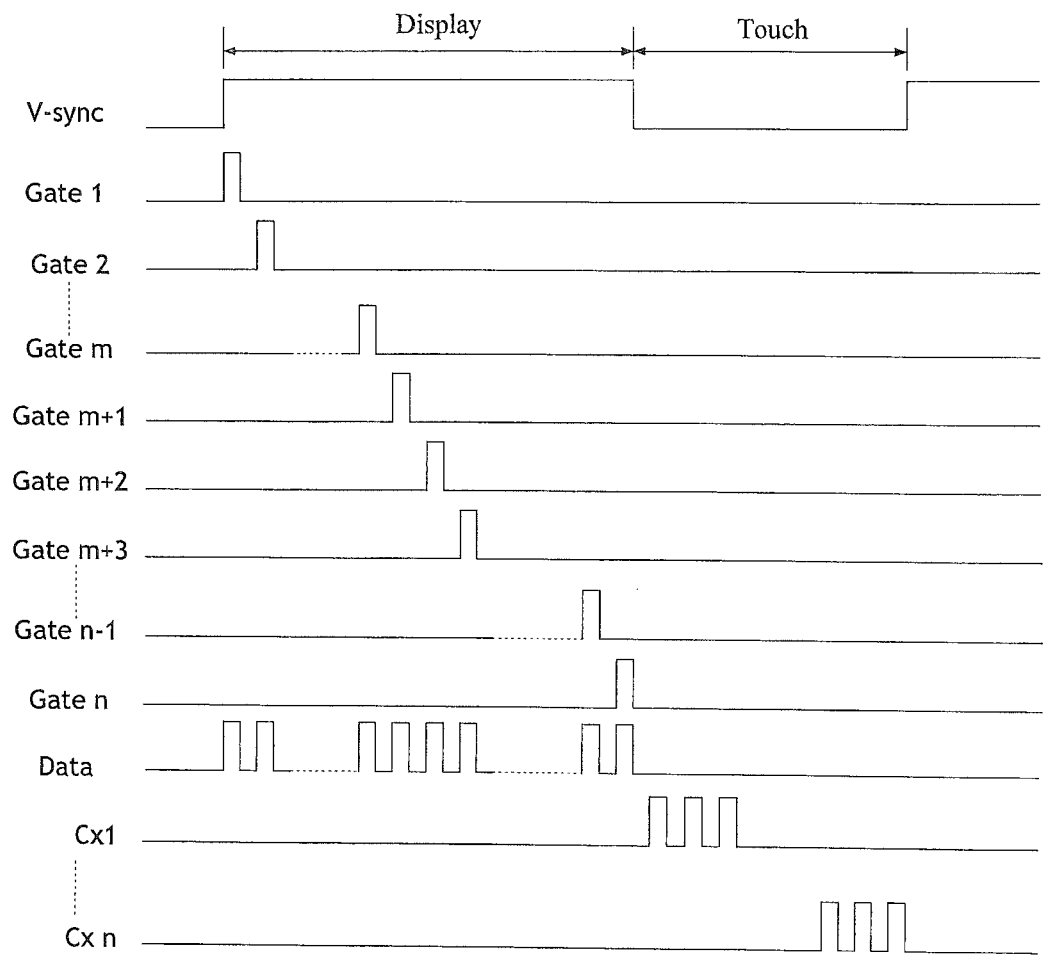
FIG. 7b is a schematic diagram of a driving time sequence for an in-cell touch panel according to another exemplary embodiment of the present disclosure.

Exemplarily, in driving time sequence diagrams shown in FIG. 7a and FIG. 7b, each frame period (V-sync) of the touch panel is divided into a display time period (Display) and a touch time period (Touch); for example, in driving time sequence diagrams shown in FIG. 7a and FIG. 7b, a period for display one frame of the touch panel is 16.7 ms, from which 5 ms is selected as the touch time period, and the remaining 11.7 ms is selected as the display time period. Of course, durations of the touch time period and the display time period may be adjusted according to processing ability of the IC chip, and are not particularly limited herein. During the display time period (Display), gate scanning signals are applied in order to respective gate signal lines Gate1, Gate2 . . . Gaten of the touch panel, gray scale signals are applied to data signal lines Data, and a common electrode signal is respectively applied to respective self-capacitance electrodes Cx1 . . . Cxn from the touch detection chip connected with the self-capacitance electrodes Cx1 . . . Cxn, thereby achieving a liquid crystal display function. During the touch time period (Touch), as shown in FIG. 7a, a driving signal is simultaneously applied to respective self-capacitance electrodes Cx1 . . . Cxn from the touch detection chip connected with the self-capacitance electrodes Cx1 . . . Cxn, while feedback signals from respective self-capacitance electrodes Cx1 . . . Cxn are received by the touch detection chip; also, as shown in FIG. 7b, a driving signal may sequentially be applied to respective self-capacitance electrodes Cx1 . . . Cxn from the touch detection chip connected with the self-capacitance electrodes Cx1 . . . Cxn, while feedback signals from respective self-capacitance electrodes Cx1 . . . Cxn are respectively received by the touch detection chip, and the present disclosure is not limited to this. The feedback signals are analyzed to determine whether or not a touch action occurs, thereby achieving a touch function.

Further, in order to simplify manufacturing process and reduce production cost, the above in-cell touch panel according to embodiments of the present disclosure may further comprise data lines below the self-capacitance electrodes, and the respective conductive wires and the data lines are arranged in the same layer and made of the same material. As such, during manufacturing, the respective conductive wires and the data lines are manufactured in the same layer, so that it is not required to add any new manufacturing process, and it only needs to change patterns of corresponding film layers, thereby simplifying process steps, saving production cost, and improving production efficiency.

Generally, a density of a touch panel is typically in millimeter scale, thus when implemented in practice, density and occupying areas of the respective self-capacitance electrodes may be selected according to the desired touch density so as to meet the requirement of the desired touch density. The self-capacitance electrodes each is typically designed into a quadrate electrode of about 5 mm×5 mm, while a pixie density of the display panel is generally in micrometer scale, thus one self-capacitance electrode will correspond to a plurality of pixel units in the display panel.

In the above in-cell touch panel according to embodiments of the present disclosure, the exiting common electrode layer which is wholly arranged on the lower substrate is partitioned into a plurality of self-capacitance electrodes, thus in order to avoid the normal display function from being adversely affect, it is preferable that when partitioning the common electrode layer, the partition lines keep away from an opening region for display and are located within a region of a pattern of a black matrix layer.

Exemplarily, the above in-cell touch panel according to embodiments of the present disclosure may further comprises a black matrix layer located on a side of the lower substrate facing toward the upper substrate or on a side of the upper substrate facing toward the lower substrate, and a direct projection of a separation gap between two adjacent self-capacitance electrodes on the lower substrate is located within a region where a pattern of the black matrix layer is located.

Based on the same inventive concept, embodiments of the present disclosure further provide a display device, comprising the in-cell touch panel according to the above embodiments of the present disclosure, the display device may be a mobile phone, a tablet computer, a TV, a display, a laptop, a digital picture frame, a navigator or any other products or components having a display function. The display device may be implemented with reference to the embodiments of the in-cell touch panel as described above.

With the in-cell touch panel and display device according to embodiments of the present disclosure, each self-capacitance electrode is provided with a longitudinal slit within a region of the self-capacitance electrode corresponding to a gap between two adjacent pixel units in a row direction, and/or each self-capacitance electrode is provided with a transversal slit within a region of the self-capacitance electrode corresponding to a gap between two adjacent pixel units in a column direction, thus it can ensure that the slits in the self-capacitance electrodes and the gaps between the self-capacitance electrodes are uniformly arranged in the whole in-cell touch panel, thereby overcoming the defects such as bright lines, dark lines or the like in the in-cell touch panel.

It would be apparent that the person skilled in the art may make various changes or modifications to the present disclosure without departing from spirit and scopes of the disclosure. Thus, if these changes or modifications to the present disclosure fall within scopes of claims and equivalents thereof of the present invention, the present invention is intended to include these changes or modifications therein.

What is claimed is:

1. An in-cell touch panel, comprising:
    an upper substrate and a lower substrate oppositely arranged,
    a number of pixel units arranged in a matrix on the lower substrate,
    a number of independent self-capacitance electrodes located on a side of the upper substrate facing toward the lower substrate or a side of the lower substrate facing toward the upper substrate, being independent of each other and each corresponding to one or more of the pixel units; and
    conductive wires each electrically connected with a corresponding one of the respective self-capacitance electrodes, wherein
    a longitudinal slit is provided in each self-capacitance electrode at a position inside the circumference of the self-capacitance electrode, and an ortographic projection of the longitudinal slit onto the lower substrate is located within a gap between two adjacent pixel units in a row direction of the matrix; and/or a transversal slit is provided in each self-capacitance electrode at a position inside the circumference of the self-capacitance electrode, and an ortographic projection of the longitudinal slit onto the lower substrate is located within a gap between two adjacent pixel units in a column direction of the matrix.

2. The in-cell touch panel according to claim 1, wherein each self-capacitance electrode is further provided with one or more longitudinal slits and/or one or more transversal slits within a region of the self-capacitance electrode corresponding to each pixel unit.

3. The in-cell touch panel according to claim 2, wherein a width of the longitudinal slit is equal to a width of a gap between two adjacent columns of self-capacitance electrodes.

4. The in-cell touch panel according to claim 2, wherein a width of the transversal slit is equal to a width of a gap between two adjacent rows of self-capacitance electrodes.

5. The in-cell touch panel according to claim 2, wherein in each self-capacitance electrode, lengths of respective longitudinal slits are equal, and/or lengths of respective transversal slits are equal.

6. The in-cell touch panel according to claim 2, wherein the transversal slits and the longitudinal slits in all self-capacitance electrodes are arranged in the same regular pattern.

7. The in-cell touch panel according to claim 2 wherein the self-capacitance electrodes being independent of each other are arranged in the same layer.

8. The in-cell touch panel according to claim 7, wherein
the respective self-capacitance electrodes form a common electrode layer located on the side of the lower substrate facing toward the upper substrate, and
the in-cell touch panel further comprises a touch detection chip, configured to apply a common electrode signal to the respective self-capacitance electrodes during a display time period of the in-cell touch panel, and to detect changes in capacitance values of the respective self-capacitance electrodes to determine a touch position during a touch time period of the in-cell touch panel.

9. The in-cell touch panel according to claim 8 further comprising data lines below the self-capacitance electrodes;
wherein the respective conductive wires and the data lines are arranged in the same layer and made of the same material.

10. The in-cell touch panel according to claim 8, further comprising a black matrix layer located on a side of the lower substrate facing toward the upper substrate or on a side of the upper substrate facing toward the lower substrate;
wherein a direct projection of a separation gap between every two adjacent self-capacitance electrodes on the lower substrate is located within a region where a pattern of the black matrix layer is located.

11. A display device, comprising the in-cell touch panel according to claim 2.

12. The in-cell touch panel according to claim 1, wherein a width of the longitudinal slit is equal to a width of a gap between two adjacent columns of self-capacitance electrodes.

13. The in-cell touch panel according to claim 1, wherein a width of the transversal slit is equal to a width of a gap between two adjacent rows of self-capacitance electrodes.

14. The in-cell touch panel according to claim 1, wherein in each self-capacitance electrode, lengths of respective longitudinal slits are equal, and/or lengths of respective transversal slits are equal.

15. The in-cell touch panel according to claim 1, wherein the transversal slits and the longitudinal slits in all self-capacitance electrodes are arranged in the same regular pattern.

16. The in-cell touch panel according to claim 1, wherein the self-capacitance electrodes being independent of each other are arranged in the same layer.

17. The in-cell touch panel according to claim 16, wherein
the respective self-capacitance electrodes form a common electrode layer located on the side of the lower substrate facing toward the upper substrate, and
the in-cell touch panel further comprises a touch detection chip, configured to apply a common electrode signal to the respective self-capacitance electrodes during a display time period of the in-cell touch panel, and to detect changes in capacitance values of the respective self-capacitance electrodes to determine a touch position during a touch time period of the in-cell touch panel.

18. The in-cell touch panel according to claim 17, further comprising data lines below the self-capacitance electrodes;
wherein the respective conductive wires and the data lines are arranged in the same layer and made of the same material.

19. The in-cell touch panel according to claim 17, further comprising a black matrix layer located on a side of the lower substrate facing toward the upper substrate or on a side of the upper substrate facing toward the lower substrate;
wherein a direct projection of a separation gap between every two adjacent self-capacitance electrodes on the lower substrate is located within a region where a pattern of the black matrix layer is located.

20. A display device, comprising the in-cell touch panel according to claim 1.

* * * * *